United States Patent Office 3,420,152
Patented Jan. 7, 1969

3,420,152
PHOTOGRAPHIC CAMERA WITH
EXPOSURE METER
Dieter Engelsmann, Unterhaching, Munich, and Dieter
Maas, Munich, Germany, assignors to Agfa-Gevaert
Aktiengesellschaft, Leverkusen, Germany
Filed Nov. 30, 1965, Ser. No. 510,598
Claims priority, application Germany, Dec. 3, 1964,
A 47,765
U.S. Cl. 95—10    8 Claims
Int. Cl. G01j 1/04

ABSTRACT OF THE DISCLOSURE

The pointer of an exposure meter is movable between a stop face which is at least partially inclined with reference to the path of the pointer and a reciprocable or pivotable tracking element which can displace the pointer against the stop face to thereby adjust the shutter or diaphragm as a function of scene brightness. The tracking face of the tracking element is inclined with reference to the path for the pointer but its maximum inclination is less than that inclination at which the tracking element would cause the pointer to change its position along the path during deflection against the stop face. Excessive inclination of the tracking face can be avoided due to at least partial inclination of the stop face.

---

The present invention relates to photographic cameras in general, and more particularly to a photographic camera with built-in exposure meter. Still more particularly, the invention relates to improvements in photographic cameras of the type wherein the seize of the diaphragm opening and/or the exposure time can be selected automatically as a function of the intensity of light coming from a viewed scene or subject.

It is already known to provide a photographic camera with a built-in exposure meter which comprises a moving-coil instrument whose needle is movable to a large number of different positions each of which is indicative of a different light intensity. A sensing or tracking element is movable into engagement with the needle, and such movement of the tracking element is utilized to select the seize of the diaphragm opening and/or the exposure time. When it actually engages the needle, the tracking element normally presses the needle against a fixed abutment, and the abutment has a stop face which is parallel to the path in which the needle travels. That (tracking) face of the tracking element which comes into actual engagement with the needle must be inclined or curved because, were the two faces parallel to each other, the setting of the diaphragm and/or shutter mechanism would be the same in each position of the needle. The inclination or curvature of the tracking face is not necessarily gradual because such curvature or inclination must be selected by full consideration of several factors, such as the characteristics of the moving-coil instrument, the type of motion transmitting connection which couples the tracking element with the diaphragm and/or shutter mechanism, the type of diaphragm, the type of shutter, and others. Therefore, it happens again and again that, when the needle of the moving-coil instrument is engaged by such portion of the tracking face which is strongly inclined or curved with reference to the needle path and hence with reference to the corresponding portion of the stop face on the abutment, the needle is likely to be displaced so that the setting of the diaphragm and/or shutter does not accurately reflect the intensity of light coming from a viewed scene or subject.

It was already proposed to avoid such uncontrolled displacement of the needle by resorting to a clamping member which engages the needle before the needle is engaged by the tracking element, and which clamps the needle against the abutment. However, such constructions are rather complicated because they must include an additional needle engaging (clamping) member and because the clamping member must be coupled with the trigger of the camera. Also, and since the needle must be engaged by three different parts, it must be made rather strong which, in turn, reduces the sensitivity of the exposure meter.

Accordingly, it is an important object of the present invention to provide a photographic camera wherein the diaphragm and/or the shutter may be adjusted in such a way that its setting is a function of the intensity of incoming light and wherein any, even minimal, uncontrolled displacements of the needle of the moving-coil instrument are prevented in a very simple manner without resorting to a needle clamping member.

Another object of the invention is to provide a novel abutment for the needle of the moving-coil instrument which may be utilized in a camera of the just outlined characteristics.

A further object of the invention is to provide a novel tracking element for the needle of the moving-coil instrument and to construct and mount the tracking element in such a way that, by cooperating with the improved abutment, it cannot cause any uncontrolled displacements of the needle so that the automatic setting of the diaphragm and/or shutter invariably reflects, with utmost accuracy, the lighting conditions under which the exposure is about to be made.

An additional object of the invention is to provide an automatic exposure control for photographic cameras which embodies the above outline abutment and tracking eltment.

Still another object of the invention is to provide an automatic exposure control which occupies little room in the housing of a camera, which is sufficiently rugged to be suited for use in still cameras, and which can embody exposure meters wherein the needle travels in a straight, arcuate or otherwise configurated path.

A concomitant object of the invention is to provide an exposure control wherein the tracking element which determines the setting of the diaphragm and/or shutter may be moved in a straight or arcuate path and wherein the needle of the moving-coil instrument may be positioned to move in a substantially horizontal, substantially vertical or otherwise inclined plane.

Briefly stated, one feature of our invention resides in the provision of a photographic camera which comprises an exposure meter having a moving-coil instrument provided with an indicator needle movable in a predetermined plane to assume a plurality of positions each of which is indicative of a different light intensity, a fixed abutment having a stop face which is adjacent to one side of the aforementioned plane, a tracking element which is arranged to select at least one exposure value (i.e., the size of the diaphragm opening and/or the exposure time) and is provided with a tracking face located at the opposite side of and inclined with reference to the aforementioned plane, and actuating means for moving the tracking element toward and away from the abutment to move the tracking face into and out of engagement with the needle whereby the needle is held between the two faces when the tracking element moves toward the abutment. The inclination of the two faces is such that, when the needle is held between the abutment and the tracking element or when the needle is engaged by the tracking element alone, it is invariably prevented from moving in its plane. The needle is normally spaced from the abutment but is movable from its plane and against the stop face in response to engagement by the tracking face and in response to further movement of the tracking element toward the abutment. The tracking element selects one or more exposure values as a function of the intensity of incoming light (i.e., as a function of the position of the needle) at that very moment when the tracking face cannot move any further toward the abutment because the needle is held between the two faces.

The aforementioned mutual inclination of the two faces is preferably such that at least a portion of the stop face is inclined with reference to the plane of the needle. That portion of the tracking face which cooperates with the inclined portion of the stop face is also inclined with reference to the plane of the needle, but the inclination of such tracking face portion is less than would be necessary were the aforementioned portion of the stop face parallel with the plane of the needle.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which:

Figure 1:
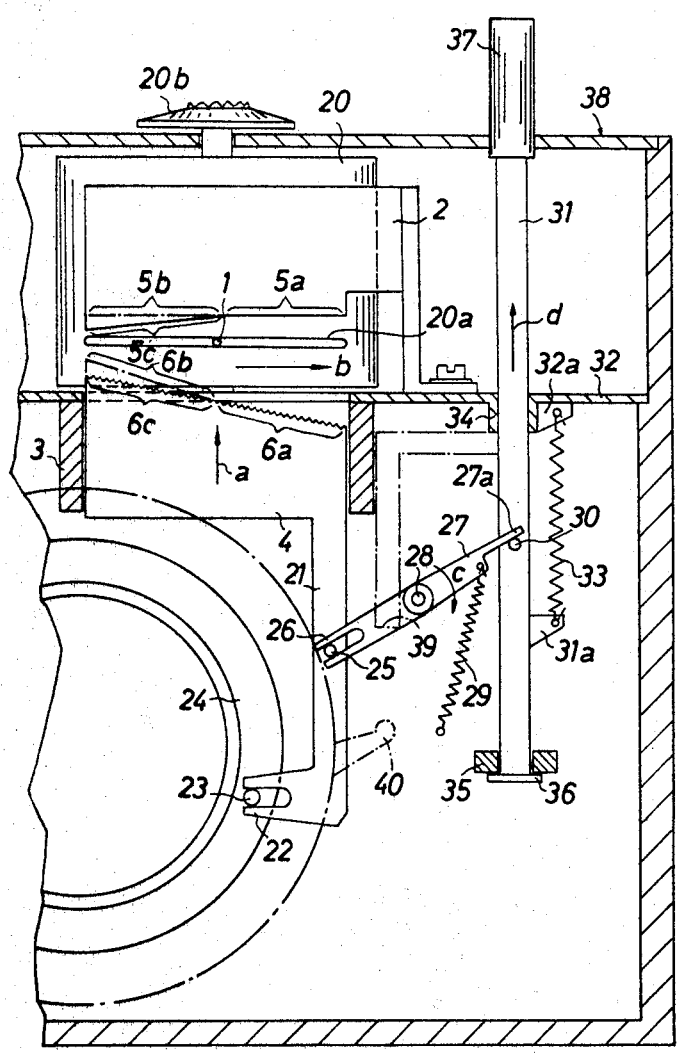
FIG. 1 is a fragmentary front elevational view of a still camera which embodies one form of our invention, the housing of the camera being shown in vertical section and the indicator needle of the moving-coil instrument being movable in a flat horizontal plane.

Referring first to FIG. 1, there is shown a portion of a still camera which comprises a housing 38 accommodating an exposure meter including a moving-coil instrument 20. This instrument comprises a vertical shaft (not shown) which is turnable by the moving-coil and carries an indicator in the form of a needle 1. The needle 1 is movable about the axis of the instrument shaft and then travels in a flat horizontal plane defined by a horizontal slot 20a in the casing of the instrument 20. The circuit of the moving-coil includes a photosensitive resistor or cell of known design which is located in the path of light rays coming from a viewed scene or subject and which causes the needle 1 to assume an angular position which is an exact function of the light intensity. The photosensitive element is well known in the art and, therefore, need not be shown in the drawings. A knob 20b serves to change the angular position of the instrument 20 to thereby account for the sensitivity of film which is being used by the operator.

A horizontal internal partition 32 of the camera housing 38 carries a fixed abutment in the form of a plate 2 which is adjacent to the upper side of the plane (slot 20a) of the needle 1 and is provided with a specially configurated stop face composed of elongated portions 5a and 5c. The portion 5a is parallel with the plane of the slot 20a but the portion 5c is inclined downwardly with reference to the portion 5a, i.e., toward the plane of the needle 1. In heretofore known cameras, the abutment 2 comprises a stop face with aligned portions 5a, 5b (the letter is shown by phantom lines) which are parallel with the plane of the slot 20a.

The camera further comprises a reciprocable tracking element 4 which is guided by ways 3 provided on the partition 32 and is formed with an inclined tracking face composed of elongated portions 6a, 6c which are located at the underside of the slot 20a. The tracking element 4 is reciprocable in a straight path (at right angles to the slot 20a) in an counter to the direction indicated by an arrow a, and its purpose is to automatically select an exposure value (in the present instance the size of the diaphragm opening) as a function of the intensity of light which comes from a viewed scene or subject, i.e., as a function of the angular position of the indicator needle 1. The tracking element 4 is provided with an elongated extension or arm 21 which carries a forked terminal portion 22 straddling a pin 23 provided on a rotary diaphragm adjusting ring 24. The ring 24 will be rotated in a clockwise or counterclockwise direction, depending on the direction in which the tracking element 4 moves in its ways 3. Normally, the ring 24 will be held in an initial position in which the diaphragm opening is reduced to zero or attains its maximum size. FIG. 1 shows the tracking element 4 and the adjusting ring 24 in idle positions, i.e., the finely toothed, serrated or otherwise roughened tracking face (portions 6a and 6c) of the element 4 is spaced from the slot 20a and does not engage the needle 1 so that the latter is free to assume an angular position which is an exact function of the light intensity.

The actuating means for moving the tracking element 4 upwardly (arrow a) and into engagement with the needle 1 comprises a helical spring 29 which is coupled to the righthand arm of a two-armed motion transmitting lever 27 fulcrumed at 28. The fulcrum 28 is rigid with the housing 38. When the lever 27 is free to follow the bias of the spring 29, it rotates in a clockwise direction (arrow c) and its bifurcated end portion 26 which straddles a pin 25 on the extension 21 causes the tracking element 4 to move upwardly whereby the tracking face engages the underside of the needle 1 and deflects a portion of this needle into actual abutment with the stop face of the abutment 2. The spring 29 is normally prevented from rotating the lever 27 because a pallet 27a at the righthand end of this lever bears against a stop pin 30 provided on a reciprocable release trigger 31 which is permanently biased by a relatively strong helical return spring 33. The spring 33 operates between a lug 31a of the trigger 31 and a lug 23a of the partition 32 and tends to move the trigger upwardly (arrow d). The bias of this spring 33 is stronger than the bias of the spring 29 so that, when the pushbutton or head 37 of the trigger 31 is released by the finger of a photographer, the spring 33 contracts and moves the trigger upwardly whereby the lever 27 rotates in a counterclockwise direction and its end portion 26 shifts the tracking element 4 downwardly and away from the needle 1. The trigger 31 is guided in bearings 34, 35 and carries a collar 36 which abuts against the underside of the bearing 35 when the spring 33 has caused the element 4 to return to its idle position and when the pushbutton 37 returns to a starting position.

The trigger 31 further carries an L-shaped extension or trip 39 which can move into engagement with an actuating member 40 forming part of the shutter mechanism and serving to open the shutter mechanism subsequent to proper selection of the size of the diaphragm opening by the ring 24. In other words, when the trigger 31 is depressed against the bias of its return spring 33, the pin 30 moves downwardly and allows the spring 29 to contract and to move the tracking face of the element 4 into actual engagement with the needle 1. The movement of the element 4 in the direction of the arrow a is terminated after the tracking face engages the needle 1, namely, when the needle 1 is actually held between the cooperating faces of the parts 2 and 4. The terminal portion 22 of the extension 21 then maintains the pin 23 in an angular position in which the ring 24 has selected an optimum size of the diaphragm opening for a particular exposure. The trigger 31 then continues to move downwardly and the trip 39 ultimately engages the member 40 to actuate the shutter mechanism.

Of course, if the camera includes a so-called everset shutter, the tracking element may simultaneously select the exposure time and the size of the diaphragm opening.

Also, the extension 21 may be used to select the exposure time instead of selecting the size of the diaphragm opening or to select both exposure values in dependency on the angular portion of the needle 1.

At least one of the cooperating faces on the abutment 2 and tracking element 4 must be inclined with reference to the longitudinal direction of the slot 20a because, otherwise, the extension 21 would invariably select the same size of the diaphragm opening. In conventional cameras, the stop face of the abutment 2 is normally parallel with the plane in which the indicator needle 1 moves, i.e., the stop face of the abutment in a conventional camera consists of aligned portions 5a and 5b which are parallel with the slot 20a. Various exposure times and/or diaphragm settings are achieved by suitably inclining or curving the face of the tracking element 4. The inclination or curvature of the tracking face depends on several factors such as the type of diaphragm or shutter mechanism, the ratio of the motion transmitting connection between the tracking element and the diaphragm and/or shutter mechanism, the characteristics of the instrument 20, and others. Thus, and were the stop face of the abutment 2 composed of portions 5a and 5b, the tracking face of the element 4 would have to be composed of portions 6a and 6b. It will be noted that the inclination of the phantom-line portion 6b with reference to the longitudinal extension of the slot 20a is such that, when engaged by this strongly inclined portion 6b, the needle 1 would be likely to be displaced in the direction of the arrow b so that its position would fail to accurately reflect the intensity of incoming light and the size of the diaphragm opening would not be an exact function of such intensity.

In accordance with our present invention, such excessive inclination of a portion of the tracking face on the element 4 is avoided by forming this element with a tracking face consisting of portions 6a and 6c whereby the difference in inclination of the portions 6b, 6c is compensated for by the inclination of the stop face portion 5c. The needle 1 is much less likely to be displaced in the direction of the arrow b when it is moved into actual abutment with the stop face of the abutment 2, i.e., the danger of uncontrolled displacement arises mainly when the needle 1 is engaged by the tracking face of the element 4 and while the needle is being deflected from the plane defined by the slot 20a and into actual contact with the corresponding portion of the stop face on the abutment 2. Such danger of uncontrolled needle displacement is fully eliminated by the advent of our present invention according to which the inclination of the tracking face on the element 4 always remains below an inclination which could cause the needle 1 to move from a position dictated by the momentary lighting conditions. As stated before, the inclination of the stop face portion 5c with reference to the slot 20a is selected with a view to fully compensate for the difference in inclination of the tracking face portions 6b and 6c.

It is clear that, though FIG. 1 shows a tracking face wherein the tracking portion 6c has the same inclination as the tracking portion 6a, the face of the element 4 may be configurated in a number of other ways as long as it cannot initiate uncontrolled displacement of the needle 1 along the slot 20a and as long as the element 4 can accurately select at least one exposure value. As stated hereinabove, the needle 1 is likely to be displaced at the time when it is engaged by the element 4 and when it is still spaced from the abutment 2. The fact that the portion 5c of the stop face on the abutment 2 is inclined with reference to the slot 20a does not result in uncontrolled displacement of the needle 1 when the latter is caused to move into actual engagement with the stop face.

Figure 2:
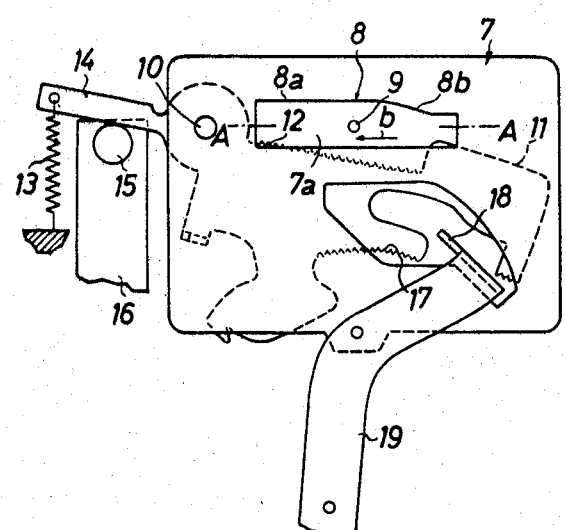
FIG. 2 is a fragmentary front elevational view of a modified camera wherein the tracking element constitutes a pivotable lever.

In the camera of FIG. 2, the indicator needle 9 extends through an elongated cutout 7a provided in a fixed abutment 7. The needle 9 is movable about a vertical axis defined by the shaft of the moving-coil instrument and can assume a plurality of different positions in a horizontal plane A—A. The stop face 8 of the abutment 7 is located above the plane A—A and comprises two elongated portions 8a, 8b. The portion 8a is parallel with the plane A—A but the portion 8b slants downwardly and toward the path of the needle 9.

The tracking element 11 resembles a lever which is pivotable about a pin 10 located laterally of the stop face 8, and the element 11 comprises a roughened tracking face 12 whose inclination is again such that, at the moment of engagement with the needle 9, the latter is not likely to be displaced in the direction of the arrow b. The tracking element 11 comprises an extension 14 which is biased by a helical spring 13 corresponding to the spring 29 of FIG. 1 and tending to move the tracking face 12 toward and into engagement with the needle 9 so that the needle is displaced from the plane A—A and comes into actual contact with the adjoining portion of the stop face 8. A pin 15 on the release trigger 16 normally holds the tracking element 11 in its idle position under the bias of a return spring (not shown) which corresponds to the spring 33 of FIG. 1 and whose bias exceeds the bias of the spring 13. The return spring tends to move the release trigger 16 upwardly, as viewed in FIG. 2.

The tracking element 11 is provided with a second toothed, serrated or otherwise roughened face 17 which may be tracked by a follower 18 provided on a lever 19 which can select one or more exposure values. For example, the lever 19 may carry one blade of a diaphragm mechanism and is operatively coupled with one or more additional blades by means of a pin-and-slot connection so that, when its follower 18 is allowed to move into engagement with the face 17 on the tracking element 11, the size of the diaphragm opening is a function of the angular position of the needle 9. In this embodiment of our invention, the inclined portion 8b of the stop face 8 corresponds to the inclined portion 5c of the stop face on the abutment 2 of FIG. 1. The inclination of the corresponding portion of the tracking face 12 is less than were necessary if the stop face portion 8b were exactly parallel with the plane A—A.

The follower 18 of the lever 19 is allowed to move into engagement with the face 17 of the tracking element 11 after the tracking face 12 moves into engagement with the needle 9 and holds the needle against the stop face 8.

In the camera of FIG. 2, the inclination or curvature of the tracking face 12 can be readily selected in such a way that, regardless of the annular position of the needle 9, the latter is engaged by a portion of the face 12 which moves substantially at right angles to the plane A—A and cannot effect uncontrolled displacement of the needle.

Figure 3:
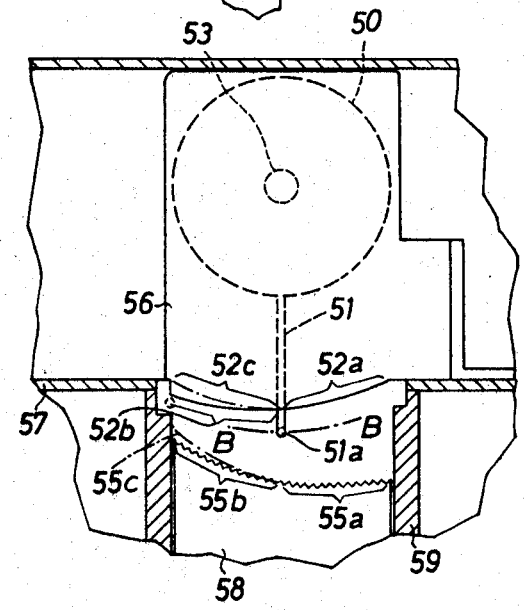
FIG. 3 is a similar fragmentary front elevational view of a third camera wherein the indicator needle is movable in an arcuate plane.

Referring finally to FIG. 3, there is shown a portion of a still camera which comprises an exposure meter including a moving-coil instrument 50 whose shaft 53 is horizontal and carries a downwardly extending indicator needle 51. The free end portion 51a of the needle 51 is bent forwardly (toward the observer of FIG. 3) and into a substantially horizontal plane so that, when the shaft 53 is rotated by the moving coil of the instrument 50, the end portion 51a of the needle 51 travels in an arcuate plane B—B. The abutment 56 is fixed to the housing 57 and its stop face is composed of two convex portions 52a, 52b. The center of curvature of the portion 52a is located on the axis of the shaft 53 but the curvature of the portion 52b is different, i.e., this portion 52b slants toward the plane B—B. The tracking element 58 is reciprocable in ways 59 and is provided with a concave tracking face which is composed of portions 55a, 55b. The centers of curvature of the portions 55a, 55b are not located on the axis of the shaft 53. Were the portion 52b of the stop face on the abutment 56 replaced by a portion 52c (which is indicated by phantom lines), the portion 55b or the tracking face would have to be replaced by a portion 55c (also shown by phantom lines) whereby the portion 55c would be likely to displace the end portion 51a of the needle 51 before the end portion 51a would be deflected into actual contact with the adjoining portion of the stop face. The center of curvature of the portion 52c (representing a portion of the stop face on a conventional abutment) is located on the axis of the shaft 53. The tracking element 58 can adjust a diaphragm mechanism and/or a shutter mechanism in the same way as described in connection with FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a photographic camera, an exposure meter including an indicator movable along a predetermined path to a plurality of positions each of which is indicative of a different light intensity; a fixed abutment having a stop face adjacent to one side of said path, at least a portion of said stop face being inclined with reference to said path; a tracking element arranged to select at least one exposure value and having a tracking face located at the other side of said path and being inclined with reference to said path; and actuating means for moving said tracking face into and away from engagement with said indicator whereby the indicator is deflected against said stop face and is held between said faces when the tracking element is moved toward said abutment, the inclination of each portion of said tracking face with reference to said path being less than that inclination at which the indicator would tend to move along said path in response to engagement by said tracking element.

2. A structure as set forth in claim 1, wherein said indicator is normally spaced from said abutment and has a portion movable against said stop face in response to engagement by said tracking face and in response to further movement of said tracking element toward said abutment.

3. A structure as set forth in claim 1, further comprising adjustable diaphragm and shutter mechanisms and an operative connection between said tracking element and at least one of said mechanisms for selecting the respective exposure value as a function of that position of said indicator in which the indicator is engaged simultaneously by said tracking and stop faces.

4. A structure as set forth in claim 1, wherein at least one of said faces is roughened.

5. A structure as set forth in claim 1, wherein said path is an arcuate path, wherein said stop face is of convex shape, and wherein said tracking face is of concave shape.

6. A structure as set forth in claim 1, wherein said tracking element is reciprocable in a direction substantially at right angles to said path.

7. A structure as set forth in claim 1, wherein said tracking element is pivotable with reference to said abutment.

8. In a photographic camera, an exposure meter including an indicator movable in a flat plane to a plurality of positions each of which is indicative of a different light intensity; a fixed abutment having a stop face adjacent to one side of said plane, said stop face including a first portion which is parallel with said plane and a second portion which is inclined with reference to said first portion in a direction toward said plane; a tracking element arranged to select at least one exposure value and having a tracking face located at the other side of said plane and being inclined with reference to said plane; and actuating means for moving said tracking element toward and away from said abutment to move said tracking face into and out of engagement with said indicator whereby the indicator is deflected against said stop face and is held between said faces when the tracking element is moved toward said abutment, the inclination of that portion of said tracking face which cooperates with the second portion of said stop face being less than would be necessary if the second portion of said stop face were parallel with said plane, said indicator being normally spaced from said abutment but being movable from said plane and against said stop face in response to engagement by said tracking face and in response to further movement of said tracking element toward said abutment, the inclination of said tracking face being such that, when engaged and deflected by said tracking element against said stop face, the indicator is prevented from moving in said plane.

References Cited

UNITED STATES PATENTS

| | | | |
|---|---|---|---|
| 3,005,390 | 10/1961 | Hahn et al. | 95—10 |
| 3,078,772 | 2/1963 | Goshima | 95—10 |
| 3,097,582 | 7/1963 | Winkler et al. | 95—10 |
| 3,106,882 | 10/1963 | Maitani | 95—10 |
| 3,276,338 | 10/1966 | Singer | 95—10 |

NORTON ANSHER, *Primary Examiner.*

J. F. PETERS, JR., *Assistant Examiner.*

U.S. Cl. X.R.

95—64